United States Patent
Yang

(10) Patent No.: US 11,502,737 B2
(45) Date of Patent: Nov. 15, 2022

(54) BEAM FAILURE RECOVERY METHOD IN MULTI-CARRIER SYSTEM AND APPARATUS

(71) Applicant: VIVO MOBILE COMMUNICATION CO.,LTD., Guangdong (CN)

(72) Inventor: Yu Yang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 55 days.

(21) Appl. No.: 17/098,261

(22) Filed: Nov. 13, 2020

(65) Prior Publication Data

US 2021/0067231 A1  Mar. 4, 2021

Related U.S. Application Data

(63) Continuation of application No. PCT/CN2019/085985, filed on May 8, 2019.

(30) Foreign Application Priority Data

May 16, 2018 (CN) .......................... 201810470331.X

(51) Int. Cl.
*H04B 7/06* (2006.01)
*H04W 72/04* (2009.01)
(Continued)

(52) U.S. Cl.
CPC ...... *H04B 7/0695* (2013.01); *H04W 72/0413* (2013.01); *H04W 72/0453* (2013.01);
(Continued)

(58) Field of Classification Search
CPC .............. H04B 7/0695; H04B 7/0602; H04W 72/0413; H04W 72/0453; H04W 72/1263;
(Continued)

(56) References Cited

U.S. PATENT DOCUMENTS

2012/0176891 A1  7/2012  Chin et al.
2016/0353510 A1*  12/2016  Zhang ................. H04W 72/085
(Continued)

FOREIGN PATENT DOCUMENTS

CN   102036284 A   4/2011
CN   107005858 A   8/2017
(Continued)

OTHER PUBLICATIONS

CN Office Action in Application No. 201810470331.X dated Jun. 3, 2021.
(Continued)

*Primary Examiner* — Harry H Kim
(74) *Attorney, Agent, or Firm* — Maschoff Brennan

(57) ABSTRACT

Embodiments of this disclosure provide a beam failure recovery method in a multi-carrier system and an apparatus, and relate to the field of communications technologies. The method is applied to UE and includes: when determining that a beam failure event occurs on a carrier corresponding to a first cell and a condition for triggering sending of a beam failure recovery request is met, sending a first beam failure recovery request message to a network-side device by using a first resource, where the first beam failure recovery request message includes first indication information, and the first indication information is used to indicate the first cell; and receiving a beam failure recovery request response message from the network-side device.

18 Claims, 8 Drawing Sheets

(51) Int. Cl.
  *H04W 72/12* (2009.01)
  *H04W 74/08* (2009.01)
  *H04W 76/19* (2018.01)
  *H04W 16/28* (2009.01)

(52) U.S. Cl.
  CPC ... *H04W 72/1263* (2013.01); *H04W 74/0833* (2013.01); *H04W 76/19* (2018.02)

(58) Field of Classification Search
  CPC ............ H04W 74/0833; H04W 76/19; H04W 72/1284; H04W 72/042; H04W 72/046; H04W 16/28
  See application file for complete search history.

(56) References Cited

U.S. PATENT DOCUMENTS

| | | | |
|---|---|---|---|
| 2018/0006770 A1 | 1/2018 | Guo et al. | |
| 2018/0110066 A1 | 4/2018 | Luo et al. | |
| 2019/0274098 A1* | 9/2019 | Cheng | H04W 76/19 |
| 2020/0255433 A1 | 8/2020 | Imig et al. | |
| 2020/0404638 A1* | 12/2020 | Deogun | H04L 5/0053 |
| 2021/0168689 A1* | 6/2021 | Shimoda | H04W 76/30 |

FOREIGN PATENT DOCUMENTS

| | | |
|---|---|---|
| CN | 107567038 A | 1/2018 |
| CN | 107612602 A | 1/2018 |
| JP | 2020534279 A | 11/2020 |

OTHER PUBLICATIONS

EP Search Report in Application No. 19802916.7 dated Jun. 1, 2021.
"Considerations on DL beam failure and recovery" CATT, 3GPP TSG RAN WG1 NR Ad-Hoc#2, R1-1710058, Jun. 27, 2017.
"Discussion of beam failure recovery for carrier aggregation" Lenovo, Motorola Mobility, 3GPP TSG RAN WG1 Meeting #92, R1-1804211, Apr. 16, 2018.
"Non-contention based random access for beam failure recovery in CA" Huawei, HiSilicon, 3GPP TSG-RAN WG2#AH-1801, R2-1801049, Jan. 22, 2018.
"Impact of beam failure and recovery on RLM procedures" AT&T, 3GPP TSG-RAN WG2 #101bis, R2-1805957, Apr. 16, 2018.
"Discussion on Beam Failure Detection for Beam Management" Huawei, HiSilicon 3GPP TSG-RAN WG4 Meeting #86bis, R4-1804790, Apr. 16, 2018.
Written Opinion and International Search Report in Application No. PCT/CN2019/085985 dated Nov. 26, 2020.
"3rd Generation Partnership Project; Technical Specification Group Radio Access Network; NR; Medium Access Control (MAC) protocol specification (Release 15)" 3GPP TS 38.321 V15.1.0 (Mar. 2018).
"3rd Generation Partnership Project; Technical Specification Group Radio Access Network; NR; Radio Resource Control (RRC) protocol specification (Release 15)" 3GPP TS 38.331 V15.1.0 (Mar. 2018).
JP Office Action in Application No. 2020-564096 dated Jan. 4, 2022.
KR Office Action in Application No. 10-2020-7036070 dated Apr. 21, 2022.
"CR to TS 38.213 capturing the RAN1#92bis meeting agreements" 3GPP TSG-RAN1 Meeting #92bis, Samsung, R1-1805795, Apr. 16, 2018.

* cited by examiner

BEAM FAILURE RECOVERY METHOD IN MULTI-CARRIER SYSTEM AND APPARATUS

CROSS-REFERENCE TO RELATED APPLICATIONS

This application is a continuation application of a PCT Application No. PCT/CN2019/085985 filed on May 8, 2019, which claims a priority to claims priority to Chinese Patent Application No. 201810470331.X, filed in China on May 16, 2018, which is incorporated herein by reference in its entirety.

TECHNICAL FIELD

This disclosure relates to the field of communications technologies, and in particular, to a beam failure recovery (beam failure recovery) method in a multi-carrier system and an apparatus.

BACKGROUND

In a high frequency band communication system, due to a relatively short wavelength of a wireless signal, communication is easily interrupted because the signal is blocked or user equipment (User Equipment, UE) is moving. In this case, the system needs to recover the communication by using beam failure recovery (beam failure recovery).

The general process of a beam failure recovery mechanism in the related art is as follows: UE obtains a hypothetical (hypothetical) physical downlink control channel (Physical Downlink Control Channel, PDCCH) block error rate (BLER) by monitoring a beam failure detection reference signal (beam failure detection reference signal) on a downlink beam at a physical layer. If the obtained hypothetical PDCCH BLER exceeds a preset threshold, the UE determines that the downlink beam fails. If detecting that all hypothetical PDCCH beams fail, the UE determines that a beam failure event (beam failure event) occurs. When the UE determines that a beam failure event occurs and a triggering condition of a beam failure recovery request is met, the UE sends a beam failure recovery request (beam failure recovery request, BFRQ) to a network-side device on a non-contention-based random access channel (Physical Random Access Channel, PRACH). After receiving the BFRQ sent by the UE, the network-side device sends response signaling to the UE. After receiving a response instruction sent by a base station, the UE performs beam failure recovery according to the response instruction sent by the base station. However, when beam failure occurs in a multi-carrier system, if beam failure recovery is performed by using the beam failure recovery mechanism in the related art, the network-side device cannot determine a carrier corresponding to a cell (Cell) in which beam failure occurs after receiving the BFRQ sent by UE, thus failing to send response signaling to the UE. Therefore, the beam failure recovery mechanism in the related art is not applicable to the multi-carrier system, and beam failure recovery cannot be performed effectively when a beam failure event occurs on a carrier in the multi-carrier system.

SUMMARY

Embodiments of this disclosure provide a beam failure recovery method in a multi-carrier system and an apparatus, so as to resolve a problem that a beam failure recovery mechanism in the related art cannot effectively perform beam failure recovery when a beam failure occurs on a carrier in a multi-carrier system.

To resolve the foregoing technical problem, this disclosure is implemented as follows.

According to a first aspect, an embodiment of this disclosure provides a beam failure recovery method in a multi-carrier system, applied to UE, where the method includes:

when determining that a beam failure event occurs on a carrier corresponding to a first cell and a condition for triggering sending of a beam failure recovery request is met, sending a first beam failure recovery request message to a network-side device by using a first resource, where the first beam failure recovery request message includes first indication information, and the first indication information is used to indicate the first cell; and receiving a beam failure recovery request response message from the network-side device.

According to a second aspect, an embodiment of this disclosure provides a beam failure recovery method in a multi-carrier system, applied to a network-side device, where the method includes:

receiving a first beam failure recovery request message sent by UE by using a first resource, where the first beam failure recovery request message includes first indication information, the first indication information is used to indicate a first cell, and the first cell is a cell corresponding to a carrier on which a beam failure event occurs; and determining the first cell based on the first indication information, and sending a beam failure recovery request response message to the UE based on the first cell.

According to the beam failure recovery method in a multi-carrier system provided in the foregoing embodiment, when it is determined that a beam failure event occurs on a carrier corresponding to a first cell and a condition for triggering sending of a beam failure recovery request is met, a first beam failure recovery request message is sent to a network-side device by using a first resource, where the first beam failure recovery request message includes first indication information, and the first indication information is used to indicate the first cell; and a beam failure recovery request response message is received from the network-side device. Because the beam failure recovery request sent by UE to the network-side device includes the first indication information that can indicate a cell corresponding to a carrier on which a beam failure event occurs, the network-side device can determine, based on the first indication information included in the beam failure recovery request, a cell in which a beam failure event occurs, so as to send the beam failure recovery request response message to the UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

According to a third aspect, an embodiment of this disclosure provides a beam failure recovery method in a multi-carrier system, applied to UE, where the method includes:

when determining that a beam failure event occurs on a carrier corresponding to a first cell and a condition for triggering sending of a beam failure recovery request is met, sending a first beam failure recovery request message to a network-side device by using a first resource, where the first resource is uniquely corresponding to the first cell; and receiving a beam failure recovery request response message from the network-side device.

According to a fourth aspect, a beam failure recovery method in a multi-carrier system is provided and applied to a network-side device, where the method includes:

receiving a first beam failure recovery request message sent by UE by using a first resource, where the first resource is uniquely corresponding to the first cell, and the first cell is a cell corresponding to a carrier on which a beam failure event occurs; and determining the first cell based on the first resource, and sending a beam failure recovery request response message to the UE based on the first cell.

According to the beam failure recovery method in a multi-carrier system provided in the foregoing embodiment, when it is determined that a beam failure event occurs on a carrier corresponding to a first cell and a condition for triggering sending of a beam failure recovery request is met, a first beam failure recovery request message is sent to a network-side device by using a first resource, and a beam failure recovery request response message is received from the network-side device. Because the first resource is uniquely corresponding to the first cell, the network-side device can determine, based on the first resource used to send the beam failure recovery request message, a cell in which a beam failure event occurs, so as to send the beam failure recovery request response message to the UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

According to a fifth aspect, an embodiment of this disclosure provides a beam failure recovery method in a multi-carrier system, applied to UE, where the method includes:

when determining that a beam failure event occurs on a carrier corresponding to a first BWP and a condition for triggering sending of a beam failure recovery request is met, sending a first beam failure recovery request message to a network-side device by using a first resource, where the first resource is uniquely corresponding to the first BWP; and receiving a beam failure recovery request response message from the network-side device.

According to a sixth aspect, an embodiment of this disclosure provides a beam failure recovery method in a multi-carrier system, applied to a network-side device, where the method includes:

receiving a first beam failure recovery request message sent by UE by using a first resource, where the first resource is uniquely corresponding to a first BWP; and determining the first BWP based on the first resource, and sending a beam failure recovery request response message to the UE based on the first BWP.

According to the beam failure recovery method in a multi-carrier system provided in the foregoing embodiment, when it is determined that a beam failure event occurs on a carrier corresponding to a first BWP and a condition for triggering sending of a beam failure recovery request is met, a first beam failure recovery request message is sent to a network-side device by using a first resource, and a beam failure recovery request response message is received from the network-side device. Because the first resource is uniquely corresponding to the first BWP, the network-side device can determine, based on the first resource used to send the beam failure recovery request message, a BWP on which a beam failure event occurs, so as to send the beam failure recovery request response message to UE based on the first BWP on which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

According to a seventh aspect, an embodiment of this disclosure provides UE, including:

a sending unit, configured to send, when it is determined that a beam failure event occurs on a carrier corresponding to a first cell and a condition for triggering sending of a beam failure recovery request is met, a first beam failure recovery request message to a network-side device by using a first resource, where the first beam failure recovery request message includes first indication information, and the first indication information is used to indicate the first cell; and a receiving unit, configured to receive a beam failure recovery request response message from the network-side device.

According to an eighth aspect, an embodiment of this disclosure provides a network-side device, including:

a receiving unit, configured to receive a first beam failure recovery request message sent by UE by using a first resource, where the first beam failure recovery request message includes first indication information, the first indication information is used to indicate a first cell, and the first cell is a cell corresponding to a carrier on which a beam failure event occurs;

a processing unit, configured to determine the first cell based on the first indication information; and a sending unit, configured to send a beam failure recovery request response message to the UE based on the first cell.

According to a ninth aspect, an embodiment of this disclosure provides UE, including:

a sending unit, configured to send, when it is determined that a beam failure event occurs on a carrier corresponding to a first cell and a condition for triggering sending of a beam failure recovery request is met, a first beam failure recovery request message to a network-side device by using a first resource, where the first resource is uniquely corresponding to the first cell; and a receiving unit, configured to receive a beam failure recovery request response message from the network-side device.

According to a tenth aspect, an embodiment of this disclosure provides a network-side device, including:

a receiving unit, configured to receive a first beam failure recovery request message sent by UE by using a first resource, where the first resource is uniquely corresponding to the first cell, and the first cell is a cell corresponding to a carrier on which a beam failure event occurs;

a processing unit, configured to determine the first cell based on the first resource; and a sending unit, configured to send a beam failure recovery request response message to the UE based on the first cell.

According to an eleventh aspect, an embodiment of this disclosure provides UE, including:

a sending unit, configured to send, when it is determined that a beam failure event occurs on a carrier corresponding to a first BWP and a condition for triggering sending of a beam failure recovery request is met, a first beam failure recovery request message to a network-side device by using a first resource, where the first resource is uniquely corresponding to the first BWP; and a receiving unit, configured to receive a beam failure recovery request response message from the network-side device.

According to a twelfth aspect, an embodiment of this disclosure provides a network-side device, including:

a receiving unit, configured to receive a first beam failure recovery request message sent by UE by using a first resource, where the first resource is uniquely corresponding to a first BWP;

a processing unit, configured to determine the first BWP based on the first resource; and a sending unit, configured to send a beam failure recovery request response message to the UE based on the first BWP.

According to a thirteenth aspect, an embodiment of this disclosure provides UE, including a processor, a memory, and a computer program that is stored in the memory and capable of running on the processor, where when the computer program is executed by the processor, the steps of the beam failure recovery method in a multi-carrier system according to the first aspect or the third aspect or the fifth aspect are implemented.

According to a fourteenth aspect, an embodiment of this disclosure provides a network-side device, including a processor, a memory, and a computer program that is stored in the memory and capable of running on the processor, where when the computer program is executed by the processor, the steps of the beam failure recovery method in a multi-carrier system according to the second aspect or the fourth aspect or the sixth aspect are implemented.

According to a fifteenth aspect, an embodiment of this application provides a computer-readable storage medium, where the computer-readable storage medium stores a computer program, and when the computer program is executed by a processor, the steps of the beam failure recovery method in a multi-carrier system according to any one of the first aspect to the sixth aspect are implemented.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figure 1:
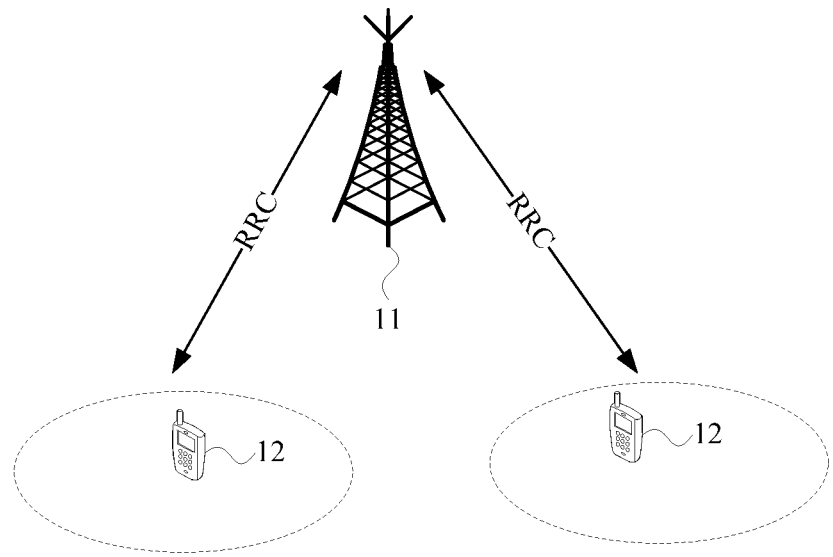
FIG. 1 is a schematic structural diagram of a communications system in an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The term "and/or" in this specification describes only an association relationship for describing associated objects and represents that three relationships may exist. For example, A and/or B may represent the following three cases: only A, both A and B, and only B. In addition, the character "/" in this specification generally represents an "or" relationship between the associated objects. In a formula, the character "/" represents a "divide" relationship between the associated objects. In this specification, "a plurality of" means two or more than two unless otherwise specified.

To clearly describe the technical solutions in the embodiments of this disclosure, terms, such as "first" and "second", are used in the embodiments of this disclosure to distinguish between same items or similar items that have a basically same function or usage. A person skilled in the art may understand that the terms, such as "first" and "second", are not intended to limit a quantity or an execution sequence.

In the embodiments of this disclosure, terms such as "illustrative" or "for example" are used to represent an example, an instance, or an illustration. Any embodiment or design scheme described as "illustrative" or "for example" in the embodiments of this disclosure should not be construed as being more preferred or advantageous than other embodiments or design schemes. To be precise, the use of terms such as "illustrative" or "for example" is intended to present a related concept in a specific manner. In the embodiments of this disclosure, "a plurality of" means two or more than two unless otherwise specified.

When a beam failure occurs in a multi-carrier system, if beam failure recovery is performed by using a beam failure recovery mechanism in the related art, a network-side device cannot determine, after receiving a BFRQ sent by UE, a carrier corresponding to a cell (Cell) in which the beam failure occurs, thus failing to send response signaling to the UE. Therefore, the beam failure recovery mechanism in the related art is not applicable to a multi-carrier system, and beam failure recovery cannot be performed when a beam failure event occurs on a carrier in the multi-carrier system.

Based on the foregoing problem, the embodiments of this disclosure provide the following solutions:

Solution 1: When it is determined that a beam failure event occurs on a carrier corresponding to a first cell and a condition for triggering sending of a beam failure recovery request is met, a first beam failure recovery request message is sent to a network-side device by using a first resource, where the first beam failure recovery request message includes first indication information, and the first indication information is used to indicate the first cell; and a beam failure recovery request response message is received from the network-side device. Because the beam failure recovery request sent by UE to the network-side device includes the first indication information that can indicate a cell corresponding to a carrier on which a beam failure event occurs, the network-side device can determine, based on the first indication information included in the beam failure recovery request, a cell in which a beam failure event occurs, so as to send the beam failure recovery request response message to the UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

Solution 2: When it is determined that a beam failure event occurs on a carrier corresponding to a first cell and a condition for triggering sending of a beam failure recovery request is met, a first beam failure recovery request message is sent to a network-side device by using a first resource, and a beam failure recovery request response message is received from the network-side device. Because the first resource is uniquely corresponding to the first cell, the network-side device can determine, based on the first resource used to send the beam failure recovery request message, a cell in which a beam failure event occurs, so as to send the beam failure recovery request response message to UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

Solution 3: When it is determined that a beam failure event occurs on a carrier corresponding to a first BWP and a condition for triggering sending of a beam failure recovery request is met, a first beam failure recovery request message is sent to a network-side device by using a first resource, and a beam failure recovery request response message is received from the network-side device. Because the first resource is uniquely corresponding to the first BWP, the network-side device can determine, based on the first resource used to send the beam failure recovery request message, a BWP on which a beam failure event occurs, so as to send the beam failure recovery request response message to UE based on the first BWP on which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

The technical solutions provided in this disclosure may be applied to various multi-carrier system communications systems, such as a 5G communications systems, a future evolved system or a plurality of communication fusion systems. A plurality of application scenarios may be included, such as machine to machine (Machine to Machine, M2M), D2M, macro-micro communications, enhanced mobile Internet (enhance Mobile Broadband, eMBB), ultra reliable and low latency communications (ultra Reliable & Low Latency Communication, uRLLC), and massive machine type communications (Massive Machine Type Communication, mMTC). These scenarios include, but are not limited to, communication between UEs, between network-side devices, or between a network-side device and UE. The embodiments of this disclosure may be applied to communication between a network-side device and UE, or between UEs, or between network-side devices in a 5G communications system.

FIG. 1 is a possible schematic structural diagram of a communications system in an embodiment of this disclosure. As shown in FIG. 1, the communications system may include a network-side device 11 (the network-side device in FIG. 1 is a base station) and at least one UE 12 (two UEs in FIG. 1). The UE 12 may communicate with the network-side device 11 by using a radio access network (Radio Access Network, RAN). The network-side device 11 generates a plurality of carriers, and each carrier is corresponding to one cell.

Further, the network-side device 11 may be a base station, a core network device, a transmit/receive node (Transmission and Reception Point, TRP), a relay station, an access point, or the like. A network-side device may be a base transceiver station (Base Transceiver Station, BTS) in global system for mobile communications (GSM) or a code division multiple access (Code Division Multiple Access, CDMA) system, may be an NB (NodeB) in a wideband code division multiple access (Wideband Code Division Multiple Access, WCDMA) system, or may be an eNB or eNodeB in LTE. The network-side device 11 may alternatively be a wireless controller in a cloud radio access network (Cloud Radio Access Network, CRAN) scenario. The network-side device 11 may alternatively be a network-side device in a 5G communications system or a network-side device in a future evolved network.

The UE 12 may be a wireless UE, and the wireless UE may be a device that provides voice and/or other service data connectivity to a user, a handheld device having a wireless communication function, a computing device, other processing devices connected to a wireless modem, an in-vehicle device, a wearable device, UE in a future 5G network, UE in a future evolved PLMN network, or the like. The wireless UE may communicate with one or more core networks by using a radio access network (Radio Access Network, RAN). The wireless UE may be a mobile terminal, such as a mobile phone (or referred to as a "cellular" phone) or a computer with a mobile terminal. For example, the wireless UE may be a portable, pocket-sized, handheld, computer built-in, or in-vehicle mobile apparatus, which exchanges voice and/or data with the wireless access network, or may be a device such as a personal communications service (PCS) phone, a cordless phone, a session initiation protocol (Session Initiation Protocol, SIP) phone, a wireless local loop (Wireless Local Loop, WLL) station, or a personal digital assistant (Personal Digital Assistant, PDA). A wireless terminal may also be referred to as a mobile device, a UE terminal, an access terminal, a radio communications device, a terminal unit, a terminal station, a mobile station (Mobile Station), a mobile (Mobile), a remote station (Remote Station), a remote terminal (Remote Terminal), a subscriber unit (Subscriber Unit), a subscriber station (Subscriber Station), a user agent (User Agent), a terminal apparatus, or the like. As an example, in this embodiment of this disclosure, a terminal shown in FIG. 1 is a mobile phone.

Embodiment 1

An embodiment of this disclosure provides a beam failure recovery method in a multi-carrier system. Specifically, referring to FIG. 2, the method includes the following steps.

S201. When determining that a beam failure event occurs on a carrier corresponding to a first cell and a condition for triggering sending of a beam failure recovery request is met, UE sends a first beam failure recovery request message to a network-side device by using a first resource.

Accordingly, the network-side device receives the first beam failure recovery request message sent by the UE to the network-side device by using the first resource.

The first beam failure recovery request message includes first indication information, and the first indication information is used to indicate the first cell.

It should be noted that the carrier corresponding to the first cell is a carrier in the multi-carrier system.

Specifically, the UE may measure a beam failure detection reference signal (BFD RS) of each carrier in the multi-carrier system at a physical layer. If the UE detects that one or more of reference signal receiving power (Reference Signal Receiving Power, RSRP), a block error rate (BLER), reference signal received quality (Reference Signal Received Quality, RSRQ) and received signal strength indication (Received Signal Strength Indication, RSSI) of the BFD RS of all serving beams (serving beam) of a carrier do not meet a preset condition, it is determined that a beam failure event occurs on the carrier.

Further, the condition for triggering sending of a beam failure recovery request may be specifically as follows: After the UE determines that a beam failure event occurs, the physical layer of the UE reports a beam failure instance (beam failure instance) to a media access control (Media Access Control, MAC) layer, and the MAC layer counts indications reported by the physical layer by using a counter (counter). When a calculation quantity of the counter reaches a preset maximum quantity, the UE is triggered to send the beam failure recovery request message to the network-side device.

Optionally, the first indication information is index information of the first cell.

For example, there are eight cells in a cell group (cell group), one of the cells is a primary cell (Primary Cell, PCell), the other seven cells are secondary cells (Secondary Cell, SCell), and indexes of the SCells range from 1 to 7. When a beam failure event occurs in the PCell, the UE reports a BFRQ by using the first resource, and the BFRQ carries index information of the PCell, or index information carried in the BFRQ is omitted and it is considered by default that a beam failure event occurs in the PCell. When a beam failure event occurs in an SCell, the UE reports the BFRQ by using the first resource, and the BFRQ carries index (index) information of the SCell in which a beam failure event occurs, or index information carried in the BFRQ is omitted and it is considered by default that a beam failure event occurs in an SCell to which the first resource for sending the BFRQ belongs.

Optionally, when the first cell is a PCell in a cell group to which the first cell belongs, the first resource for sending the BFRQ is an uplink resource in the first cell. When the first cell is an SCell in the cell group to which the first cell belongs, it is necessary to determine whether an uplink resource that can send the BFRQ is configured in the first cell. If the uplink resource that can send the BFRQ is configured in the first cell, the uplink resource for sending the BFRQ configured in the first cell is used as the first resource, and the BFRQ is sent. If no uplink resource that can send the BFRQ is configured in the first cell, the uplink resource in the PCell of the cell group to which the first cell belongs is used as the first resource, and the BFRQ is sent by using the uplink resource in the Pcell of the cell group to which the first cell belongs.

Optionally, the first resource may be the uplink resource in the PCell of the cell group to which the first cell belongs. That is, regardless of whether the first cell is a PCell or an Scell in the cell group to which the first cell belongs, the BFRQ is sent by using the uplink resource in the PCell of the cell group to which the first cell belongs.

S202. The network-side device determines the first cell based on the first indication information.

That is, the network-side device may determine, based on the first indication information carried in the BFRQ, the cell in which a beam failure event occurs.

S203. The network-side device sends a beam failure recovery request response message to the UE based on the first cell.

Accordingly, the UE receives the beam failure recovery request response message from the network-side device.

It should be noted that, in this embodiment of this disclosure, a downlink resource used when the network-side device sends the beam failure recovery request response message to the UE is not limited. The network-side device may send the beam failure recovery request response message by using a downlink resource in a cell corresponding to a carrier on which a beam failure event occurs, or may send the beam failure recovery request response message by using a downlink resource in a cell corresponding to a carrier other than a carrier on which a beam failure event occurs in the multi-carrier system. This is not limited in this embodiment of this disclosure, as long as the network device can send the beam failure recovery request response message to the UE.

For example, when the first cell is a PCell in the cell group, the network-side device sends the beam failure recovery request response message to the UE on a downlink resource in the first cell. When the first cell is an Scell in the cell group, the network-side device determines whether a downlink resource for sending the beam failure recovery request response message is configured in the first cell. If the downlink resource for sending the beam failure recovery request response message is configured in the first cell, the network-side device sends the beam failure recovery request response message to the UE on the downlink resource in the first cell. If no downlink resource for sending the beam failure recovery request response message is configured in the first cell, the network-side device sends the beam failure recovery request response message to the UE on the downlink resource in the PCell of the cell group to which the first cell belongs.

For example, the beam failure recovery request response message is sent to the UE on the downlink resource in the PCell of the cell group to which the first cell belongs.

In addition, when the UE receives the beam failure recovery request response message sent by the network-side device, it may be considered by default that a cell corresponding to the received beam failure recovery request response message is the cell indicated in the BFRQ sent to the network-side device last time, or it may be considered by default that a cell corresponding to the received beam failure recovery request response message is the cell in which a beam failure event occurs. Alternatively, the beam failure recovery request response message sent by the network-side device to the UE may carry the first indication information, so that when receiving the first indication information, the UE determines, based on the first indication information, the cell corresponding to the beam failure recovery request response message sent by the network-side device.

Further, in addition to a cell radio network temporary identifier (Cell Radio Network Temporary Identifier, C-RNTI), the beam failure recovery request response message sent by the network-side device may further carry one or more of indications of changing to a new candidate beam, restarting beam search, and the like.

According to the beam failure recovery method in a multi-carrier system provided in the foregoing embodiment, when it is determined that a beam failure event occurs on a carrier corresponding to a first cell and a condition for triggering sending of a beam failure recovery request is met, a first beam failure recovery request message is sent to a network-side device by using a first resource, where the first beam failure recovery request message includes first indication information, and the first indication information is used to indicate the first cell; and a beam failure recovery request response message is received from the network-side device. Because the beam failure recovery request sent by UE to the network-side device includes the first indication information that can indicate a cell corresponding to a carrier on which a beam failure event occurs, the network-side device can determine, based on the first indication information included in the beam failure recovery request, a cell in which a beam failure event occurs, so as to send the beam failure recovery request response message to the UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

Optionally, the first beam failure recovery request message in the foregoing embodiment further includes second indication information.

The second indication information is used to indicate a bandwidth part (Bandwidth part, BWP) on which a beam failure event occurs in the first cell.

Accordingly, the network-side device may further determine, based on the second indication information, the BWP on which a beam failure event occurs in the first cell, and send, based on the BWP on which a beam failure event occurs in the first cell, the beam failure recovery request response message to the UE.

That is, the UE may further carry the BWP on which a beam failure event occurs in the beam failure recovery request that is sent to the network-side device, so that the network-side device determines a specific BWP in the cell in which a beam failure event occurs, and then sends, based on the BWP on which the beam failure event occurs, the beam failure recovery request response message to the UE.

Optionally, the second indication information is index information of the BWP on which a beam failure event occurs in the first cell.

For example, there are eight cells in a cell group (cell group), one of the cells is a primary cell (Primary Cell, PCell), the other seven cells are secondary cells (Secondary Cell, SCell), and indexes of the SCells range from 1 to 7. Each cell includes four BWPs, and indexes of the BWPs of each cell range from 1 to 4. When a beam failure event occurs on a BWP whose index is 2 in an Scell whose index is 3, the first indication information carried in the BFRQ reported by the UE may be 3, and the second indication information carried in the BFRQ may be 2.

Further, the following describes the first resource used when the UE sends the first beam failure recovery request message to the network-side device in the foregoing embodiment.

The first resource used when the UE sends the first beam failure recovery request message to the network-side device may be configured by the network-side device for the UE by using RRC signaling.

Optionally, the first resource is an uplink resource in at least one cell in a first cell group, and the first cell group is a cell group formed by a plurality of cells corresponding to a plurality of carriers of the multi-carrier system.

For example, there are eight cells in a cell group formed by a plurality of cells corresponding to a plurality of carriers of the multi-carrier system. If one of the eight cells is a PCell, and the other seven cells are Scells, a first uplink resource may be configured in one cell, for example, the first resource is configured in the PCell, or the first resource is configured in an Scell; or a first uplink resource may be configured in 2 to 7 cells, for example, the first resource is configured in the PCell and three Scells; or a first uplink resource may be configured in all cells, that is, the first resource is configured in the PCell and seven Scells.

Optionally, the first resource is an uplink resource in at least one of BWPs in a configured cell, the configured cell is a cell, in a first cell group, configured with a physical uplink control channel PUCCH resource and/or a physical random access channel PRACH resource, and the first cell group is a cell group formed by a plurality of cells corresponding to a plurality of carriers of the multi-carrier system.

That is, the first resource may be configured on one or more BWPs of a cell, in cells corresponding to all carriers of the multi-carrier system, configured with the physical uplink control channel (Physical Uplink Control Channel, PUCCH) resource and/or the physical random access channel (Physical Random Access Channel, PRACH) resource.

For example, there are eight cells in a cell group formed by the plurality of cells corresponding to the plurality of carriers of the multi-carrier system. If one of the eight cells is a PCell, the other seven cells are Scells, the PCell is configured with the PUCCH resource and the PRACH resource, Scells with indexes 1 and 2 are configured with the PUCCH resource, and Scells with indexes 5 and 7 are configured with the PRACH resource, the first resource may be configured in one or more BWPs of the PCell and the Scells with the indexes 1, 2, 5 and 7.

In the foregoing embodiment, the first resource for sending the beam failure recovery request does not need to be configured for each BWP of each cell. Therefore, resource overheads can be reduced, and information about a carrier on which a beam failure event occurs can be accurately learned by the network-side device, thereby performing beam failure recovery.

Further, the following describes a signaling field that carries indication information in the first resource in the foregoing embodiment.

According to a first aspect, when the beam failure recovery request message sent by the UE to the network-side device carries only the first indication information, the first resource includes a first signaling field, and the first signaling field is used to carry the first indication information.

That is, the first resource includes only the first indication information. When receiving the beam failure recovery request message that includes the first indication information and that is sent by the UE, the network-side device considers by default that a beam failure event occurs in a cell indicated by the first indication information.

According to a second aspect, when the beam failure recovery request message sent by the UE to the network-side device carries only the first indication information, the first resource includes a first signaling field and a second signaling field. The first signaling field is used to carry the first indication information, the second signaling field is used to carry third indication information, and the third indication information is used to indicate that a beam failure event occurs.

When the first resource includes the first signaling field and the second signaling field, the network-side device may determine a cell based on the first indication information carried in the first signaling field, and determine, based on the third indication information carried in the second signaling field, that a beam failure event occurs, so as to determine a cell in which a beam failure event occurs.

Optionally, at least one of the first signaling field and the second signaling field in the foregoing embodiment is a reserved signaling field.

That is, the first signaling field and/or the second signaling field is a newly added signaling field in the first resource.

In addition, when the first signaling field and/or the second signaling field is a reserved signaling field, indication information carried in the reserved signaling field may be independently encoded and multiplexed with other information on the first resource, and then sent to the network-side device, or may be jointly encoded with information carried in another signaling field and then sent to the network-side device.

Optionally, at least one of the first signaling field and the second signaling field is further used to carry a scheduling request (Scheduling Request, SR).

That is, at least one of the first signaling field and the second signaling field may be a signaling field that is already included on the first resource and that carries an SR. In addition, a length of the signaling field carrying an SR may be kept unchanged to support an indication of a beam failure event and an indication of a scheduling request in the related art, or a bit length of the signaling field carrying an SR may be extended to support an indication of a beam failure event and an indication of a scheduling request.

According to a third aspect, when the beam failure recovery request message sent by the UE to the network-side device carries the first indication information and the second indication information, the first resource includes a first signaling field and a third signaling field. The first signaling field is used to carry the first indication information, and the third signaling field is used to carry the second indication information.

That is, the first resource includes the first indication information and the second indication information. When receiving the beam failure recovery request message that includes the first indication information and the second indication information and that is sent by the UE, the network-side device considers by default that a beam failure event occurs on a BWP, in a cell indicated by the first indication information, indicated in the second indication information.

According to a fourth aspect, when the beam failure recovery request message sent by the UE to the network-side device carries the first indication information and the second indication information, the first resource includes a first signaling field, a second signaling field and a third signaling field.

The first signaling field is used to carry the first indication information, the second signaling field is used to carry third indication information, the third signaling field is used to carry the second indication information, and the third indication information is used to indicate that a beam failure event occurs.

When the first resource includes the first signaling field, the second signaling field and the third signaling field, the network-side device may determine a cell based on the first indication information carried in the first signaling field, determine, based on the third indication information carried in the second signaling field, that a beam failure event occurs, and determine a BWP based on the second indication information carried in the third signaling field, so as to determine a BWP in a cell in which a beam failure event occurs.

Optionally, at least one of the first signaling field, the second signaling field and the third signaling field in the foregoing embodiment is a reserved signaling field.

That is, at least one of the first signaling field, the second signaling field and the third signaling field is a newly added signaling field in the first resource.

In addition, the newly added signaling field in the first resource may be independently encoded and multiplexed with other information on the first resource, and then sent to the network-side device, or may be jointly encoded with information carried in another signaling field and then sent to the network-side device.

Optionally, at least one of the first signaling field, the second signaling field and the third signaling field is further used to carry an SR.

That is, at least one of the first signaling field, the second signaling field and the third signaling field may be a signaling field that is already included on the first resource and that carries an SR. In addition, a length of the signaling field carrying an SR may be kept unchanged to support an indication of a beam failure event and an indication of a scheduling request in the related art, or a bit length of the signaling field carrying an SR may be extended to support an indication of a beam failure event and an indication of a scheduling request.

Figure 3:
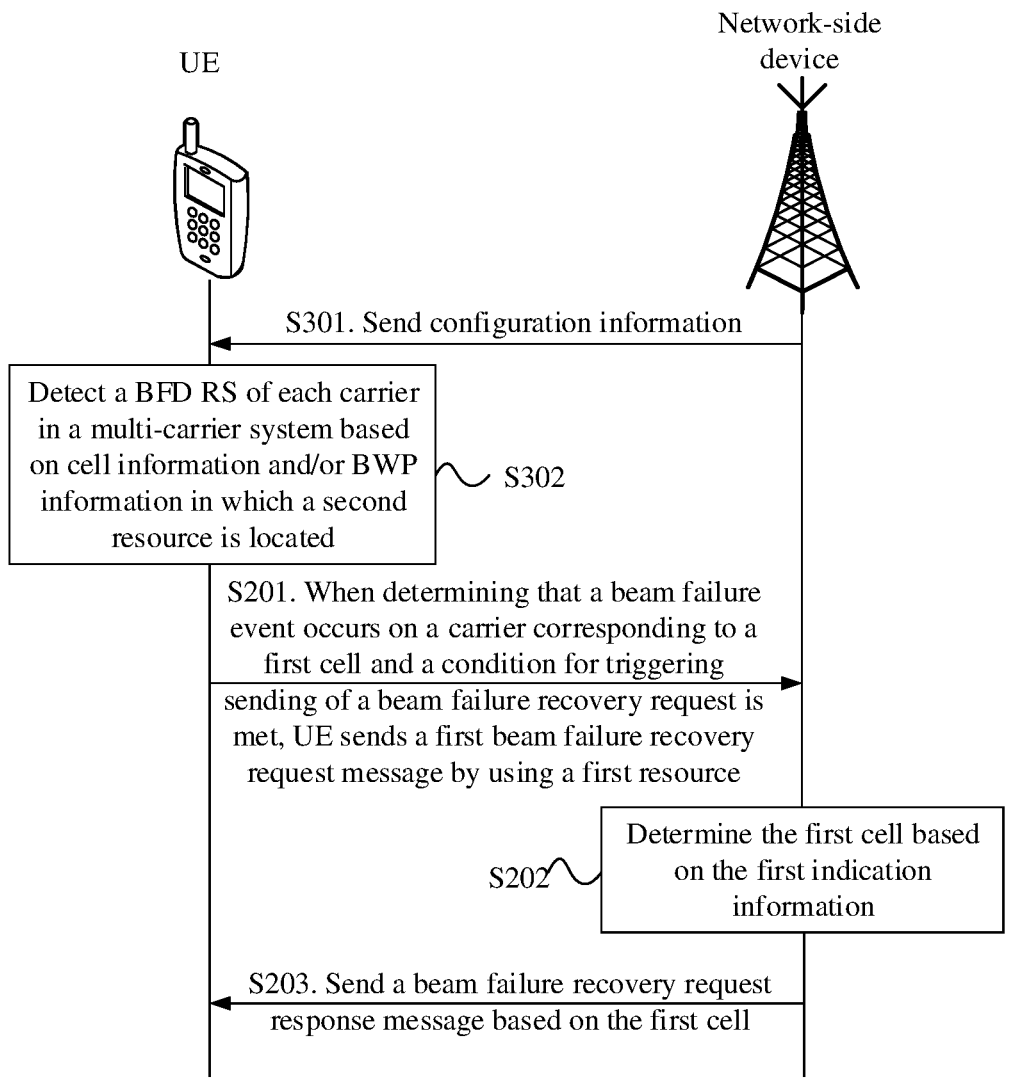
FIG. 3 is an interaction 2 of a beam failure recovery method in a multi-carrier system according to an embodiment of this disclosure.

Further, optionally, referring to FIG. 3, for the beam failure recovery method in a multi-carrier system provided in the foregoing embodiment, before S201 of sending a first beam failure recovery request message to a network-side device by using a first resource, the method further includes the following steps.

S301. The network-side device sends configuration information to the UE.

Accordingly, the UE receives the configuration information from the network-side device.

The configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

S302. The UE detects a BFD RS of each carrier in the multi-carrier system based on the cell information and/or the BWP information in which the second resource is located.

That is, the configuration information that is configured for the UE by the network-side device for sending the beam failure detection reference signal further includes the cell information and/or the BWP information in which the second resource for sending the BFD RS is located, so that the BFD RS of each carrier in the multi-carrier system is detected based on the cell information and/or the BWP information in which the second resource is located.

Embodiment 2

Figure 4:
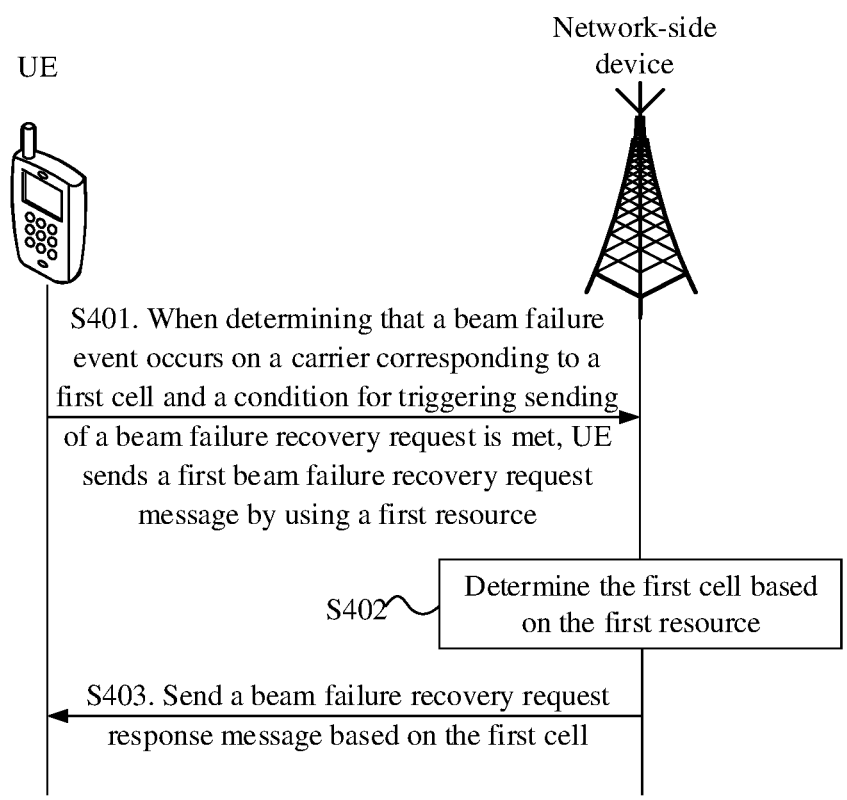
FIG. 4 is an interaction 3 of a beam failure recovery method in a multi-carrier system according to an embodiment of this disclosure.

An embodiment of this disclosure provides a beam failure recovery method in a multi-carrier system. Specifically, referring to FIG. 4, the method includes the following steps.

S401. When determining that a beam failure event occurs on a carrier corresponding to a first cell and a condition for triggering sending of a beam failure recovery request is met, UE sends a first beam failure recovery request message to a network-side device by using a first resource.

Accordingly, the network-side device receives the first beam failure recovery request message sent by the UE by using the first resource.

The first resource is uniquely corresponding to the first cell.

For example, when configuring a resource for sending the beam failure recovery request, the network-side device configures a correspondence between resources for sending beam failure recovery requests and cells.

S402. The network-side device determines the first cell based on the first resource.

S403. The network-side device sends a beam failure recovery request response message to the UE based on the first cell.

According to the beam failure recovery method in a multi-carrier system provided in the foregoing embodiment, when it is determined that a beam failure event occurs on a carrier corresponding to a first cell and a condition for triggering sending of a beam failure recovery request is met, a first beam failure recovery request message is sent to a network-side device by using a first resource, and a beam failure recovery request response message is received from the network-side device. Because the first resource is uniquely corresponding to the first cell, the network-side device can determine, based on the first resource used to send the beam failure recovery request message, a cell in which a beam failure event occurs, so as to send the beam failure recovery request response message to UE based on the cell in which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

Figure 5:
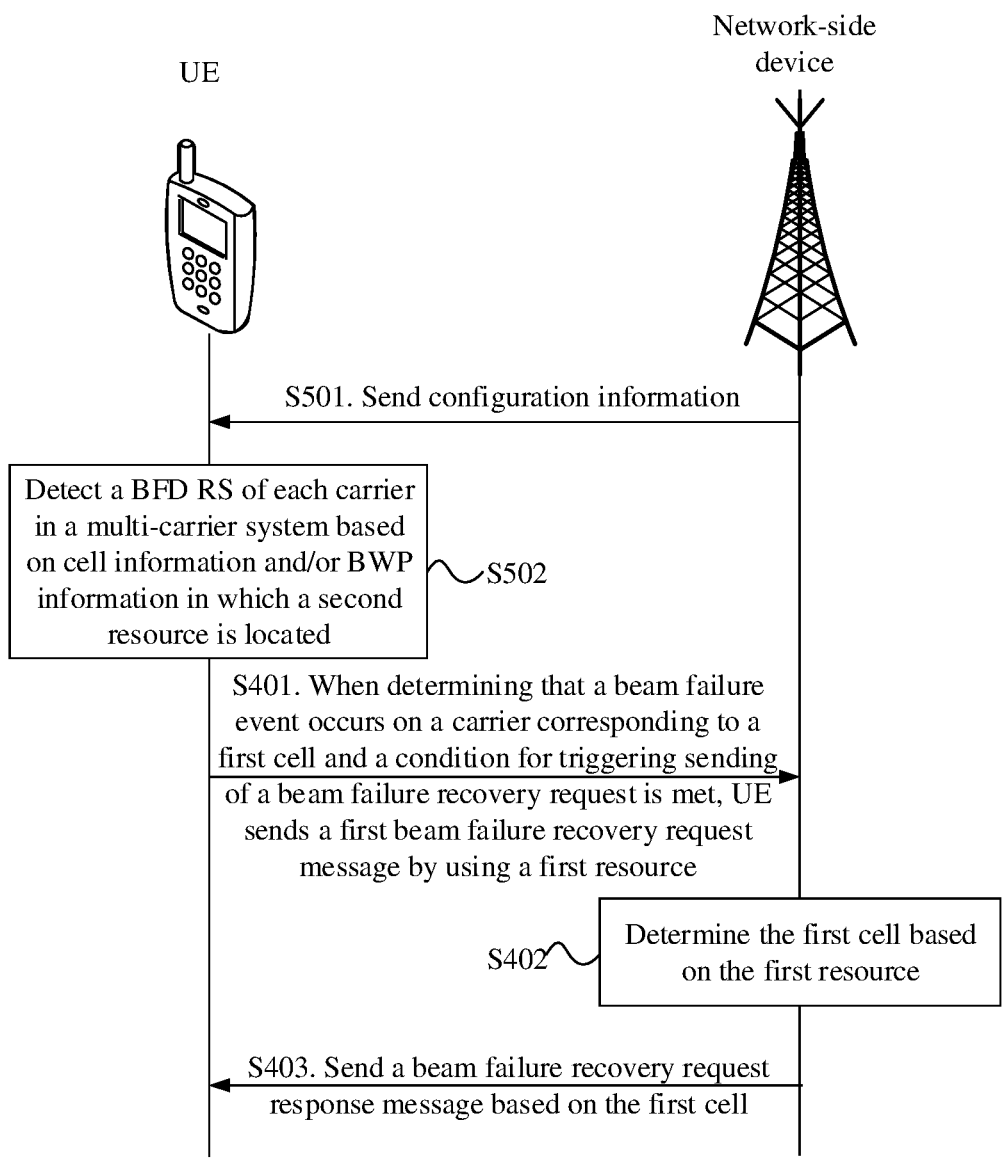
FIG. 5 is an interaction 4 of a beam failure recovery method in a multi-carrier system according to an embodiment of this disclosure.

Optionally, referring to FIG. 5, according to the beam failure recovery method in a multi-carrier system provided in the foregoing embodiment, before S401 of sending a first beam failure recovery request message to a network-side device by using a first resource, the method further includes the following steps.

S501. The network-side device sends configuration information to the UE.

Accordingly, the UE receives the configuration information from the network-side device.

The configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

S502. The UE detects a BFD RS of each carrier in the multi-carrier system based on the cell information and/or the BWP information in which the second resource is located.

That is, the configuration information that is configured for the UE by the network-side device for sending the beam failure detection reference signal further includes the cell information and/or the BWP information in which the second resource for sending the BFD RS is located, so that the BFD RS of each carrier in the multi-carrier system is detected based on the cell information and/or the BWP information in which the second resource is located.

Embodiment 3

Figure 6:
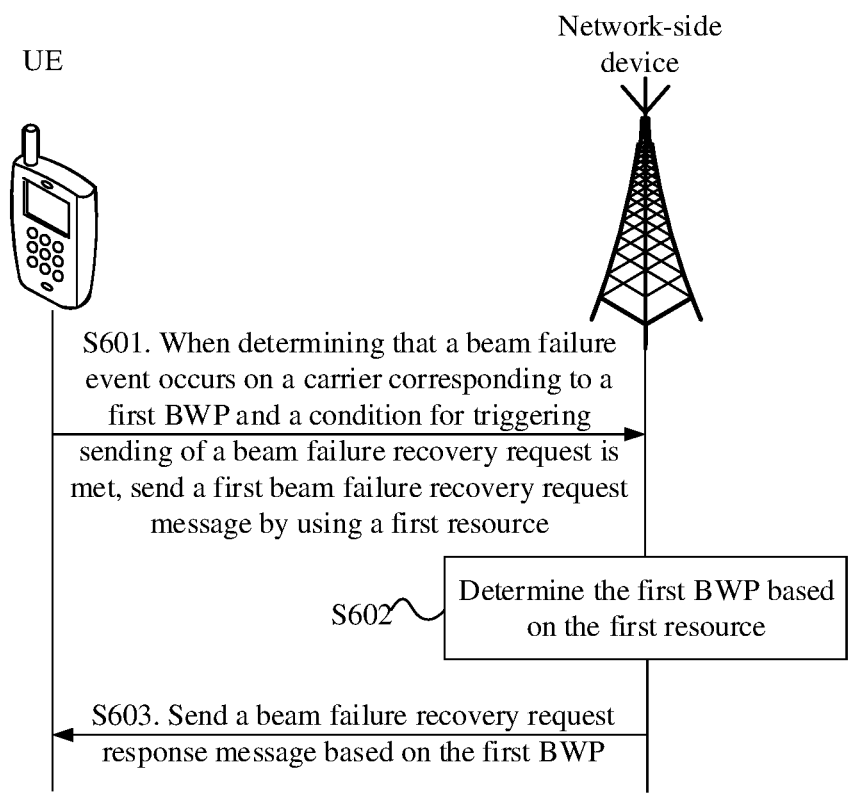
FIG. 6 is an interaction 5 of a beam failure recovery method in a multi-carrier system according to an embodiment of this disclosure.

An embodiment of this disclosure provides a beam failure recovery method in a multi-carrier system. Specifically, referring to FIG. 6, the method includes the following steps.

S601. When determining that a beam failure event occurs on a carrier corresponding to a first BWP and a condition for triggering sending of a beam failure recovery request is met, UE sends a first beam failure recovery request message to a network-side device by using a first resource.

Accordingly, the network-side device receives the first beam failure recovery request message sent by the UE by using the first resource.

The first resource is uniquely corresponding to the first BWP.

For example, when configuring a resource for sending the beam failure recovery request, the network-side device configures a correspondence between resources for sending beam failure recovery requests and BWPs in cells.

S602. The network-side device determines the first BWP based on the first resource.

S603. The network-side device sends a beam failure recovery request response message to the UE based on the first BWP.

It should be noted that the cell to which any BWP belongs in the multi-carrier system is configured by the network-side device for the UE. Therefore, after receiving the first beam failure recovery request message sent by the UE by using the first resource, the network-side device may first determine, based on the first resource, the BWP on which a beam failure event occurs, and then determine, based on the configuration information sent to the UE, a cell to which the BWP on which a beam failure event occurs belongs. Therefore, in the foregoing embodiment, the network-side device may determine the BWP on which a beam failure event occurs and the cell to which the BWP on which a beam failure event occurs belongs.

According to the beam failure recovery method in a multi-carrier system provided in the foregoing embodiment, when it is determined that a beam failure event occurs on a carrier corresponding to a first BWP and a condition for triggering sending of a beam failure recovery request is met, a first beam failure recovery request message is sent to a network-side device by using a first resource, and a beam failure recovery request response message is received from the network-side device. Because the first resource is uniquely corresponding to the first BWP, the network-side device can determine, based on the first resource used to send the beam failure recovery request message, a BWP on which a beam failure event occurs, so as to send the beam failure recovery request response message to the UE based on the first BWP on which a beam failure event occurs. Therefore, the beam failure recovery method in a multi-carrier system provided in this embodiment of this disclosure can resolve a problem that a beam failure recovery mechanism in the related art cannot perform beam failure recovery when a beam failure occurs on a carrier in a multi-carrier system.

Figure 7:
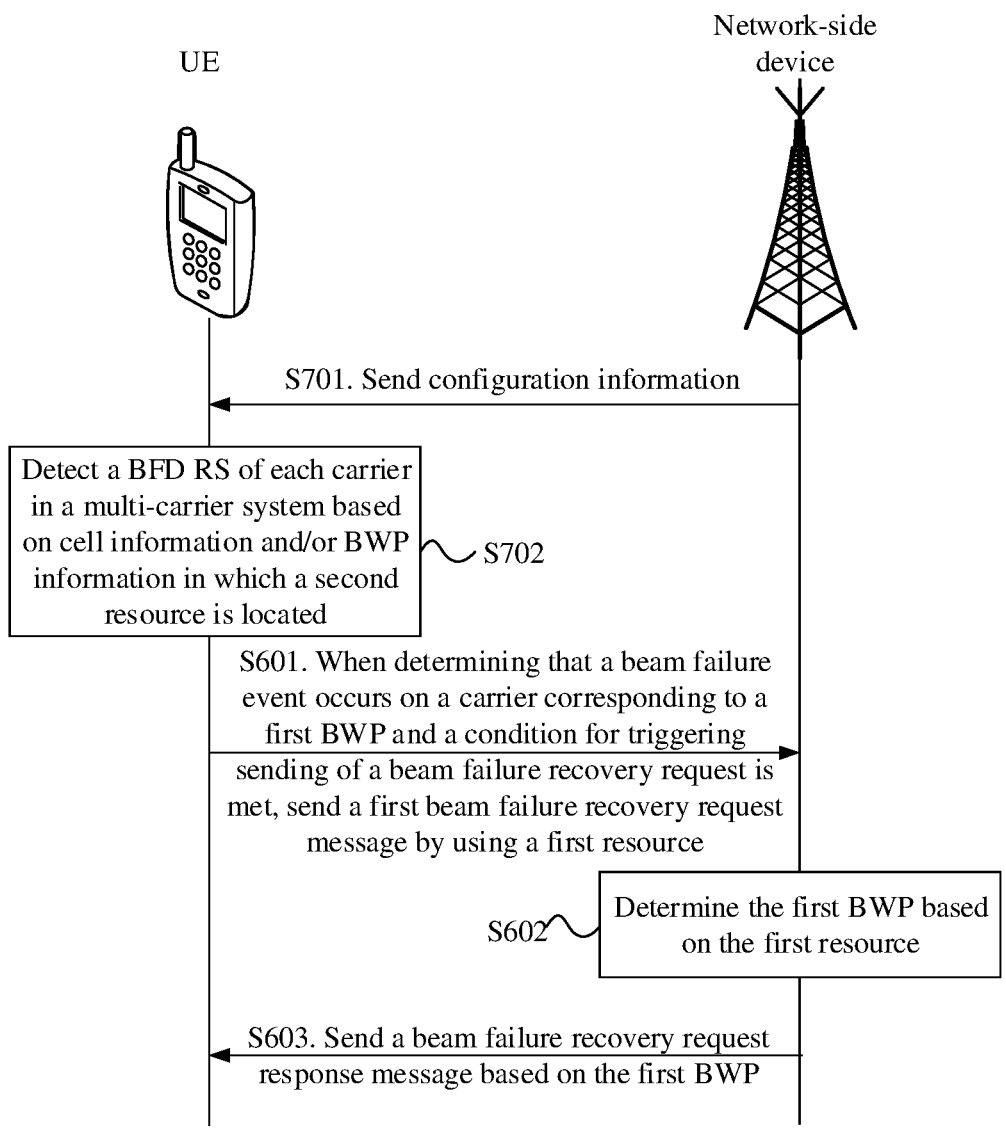
FIG. 7 is an interaction 6 of a beam failure recovery method in a multi-carrier system according to an embodiment of this disclosure.

Optionally, referring to FIG. 7, according to the beam failure recovery method in a multi-carrier system provided in the foregoing embodiment, before S601 of sending a first beam failure recovery request message to a network-side device by using a first resource, the method further includes the following steps.

S701. The network-side device sends configuration information to the UE.

Accordingly, the UE receives the configuration information from the network-side device.

The configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

S702. The UE detects a BFD RS of each carrier in the multi-carrier system based on the cell information and/or the BWP information in which the second resource is located.

That is, the configuration information that is configured for the UE by the network-side device for sending the beam failure detection reference signal further includes the cell information and/or the BWP information in which the second resource for sending the BFD RS is located, so that the BFD RS of each carrier in the multi-carrier system is detected based on the cell information and/or the BWP information in which the second resource is located.

Embodiment 4

An embodiment of this disclosure further provides a beam failure recovery method in a single carrier system, where the method is applied to UE and includes:

when determining that a beam failure event occurs on a carrier corresponding to a first BWP and a condition for triggering sending of a beam failure recovery request is met, sending a first beam failure recovery request message to a network-side device by using a first resource, where the first beam failure recovery request message includes first indication information, and the first indication information is used to indicate the first BWP; and receiving a beam failure recovery request response message from the network-side device.

An embodiment of this disclosure further provides a beam failure recovery method in a single carrier system, where the method is applied to a network-side device and includes:

receiving a first beam failure recovery request message sent by UE by using a first resource, where the first beam failure recovery request message includes first indication information, the first indication information is used to indicate a first BWP, and the first BWP is a BWP on which a beam failure event occurs; and determining the first BWP based on the first indication information, and sending a beam failure recovery request response message to the UE based on the first BWP.

In the foregoing embodiment, when it is determined that a beam failure event occurs on a carrier corresponding to a first BWP and a condition for triggering sending of a beam failure recovery request is met, a first beam failure recovery request message is sent to a network-side device by using a first resource, and a beam failure recovery request response message is received from the network-side device. Because the beam failure recovery request sent by UE to the network-side device includes a BWP that can indicate a beam failure event occurs, the network-side device can determine, based on the first indication information included in the beam failure recovery request, a BWP on which a beam failure event occurs, so as to send the beam failure recovery request response message to the UE based on the BWP on which a beam failure event occurs. Therefore, the beam failure recovery method in a single carrier system provided in this embodiment of this disclosure can resolve a problem that a beam failure recovery mechanism in the related art cannot determine a BWP, in a cell, on which a beam failure event occurs.

Embodiment 5

Figure 8:
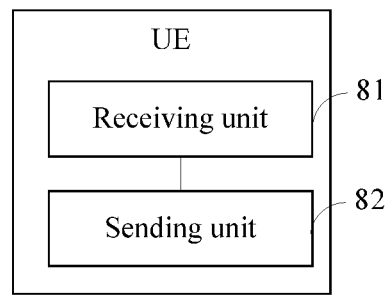
FIG. 8 is a schematic structural diagram of UE according to an embodiment of this disclosure.

An embodiment of this disclosure provides UE. Referring to FIG. 8, the UE includes a sending unit 82 and a receiving unit 81.

The sending unit 82 is configured to send, when it is determined that a beam failure event occurs on a carrier corresponding to a first cell and a condition for triggering sending of a beam failure recovery request is met, a first beam failure recovery request message to a network-side device by using a first resource, where the first beam failure recovery request message includes first indication information, and the first indication information is used to indicate the first cell.

The receiving unit 81 is configured to receive a beam failure recovery request response message from the network-side device.

Optionally, the first beam failure recovery request message further includes second indication information.

The second indication information is used to indicate a BWP on which a beam failure event occurs in the first cell.

Optionally, the first indication information is index information of the first cell.

Optionally, the second indication information is index information of the BWP on which a beam failure event occurs in the first cell.

Optionally, the first resource is an uplink resource in at least one cell in a first cell group, and the first cell group is a cell group formed by a plurality of cells corresponding to a plurality of carriers of the multi-carrier system.

Optionally, the first resource is an uplink resource in at least one of BWPs in a configured cell, the configured cell is a cell, in a first cell group, configured with a physical uplink control channel PUCCH resource and/or a physical random access channel PRACH resource, and the first cell group is a cell group formed by a plurality of cells corresponding to a plurality of carriers of the multi-carrier system.

Optionally, the first resource includes a first signaling field.

The first signaling field is used to carry the first indication information.

Alternatively, the first resource includes a first signaling field and a second signaling field.

The first signaling field is used to carry the first indication information, the second signaling field is used to carry third indication information, and the third indication information is used to indicate that a beam failure event occurs.

Optionally, the first resource includes a first signaling field and a third signaling field.

The first signaling field is used to carry the first indication information, and the third signaling field is used to carry the second indication information.

Alternatively, the first resource includes a first signaling field, a second signaling field, and a third signaling field.

The first signaling field is used to carry the first indication information, the second signaling field is used to carry third indication information, and the third signaling field is used to carry the second indication information.

The third indication information is used to indicate that a beam failure event occurs.

Optionally, at least one of the first signaling field, the second signaling field and the third signaling field is a reserved signaling field.

Optionally, at least one of the first signaling field, the second signaling field and the third signaling field is further configured to carry a scheduling request SR.

Optionally, the UE further includes a detection unit.

The receiving unit is further configured to receive configuration information from the network-side device, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

The detection unit is configured to detect a BFD RS of each carrier in the multi-carrier system based on the cell information and/or the BWP information in which the second resource is located.

Figure 2:
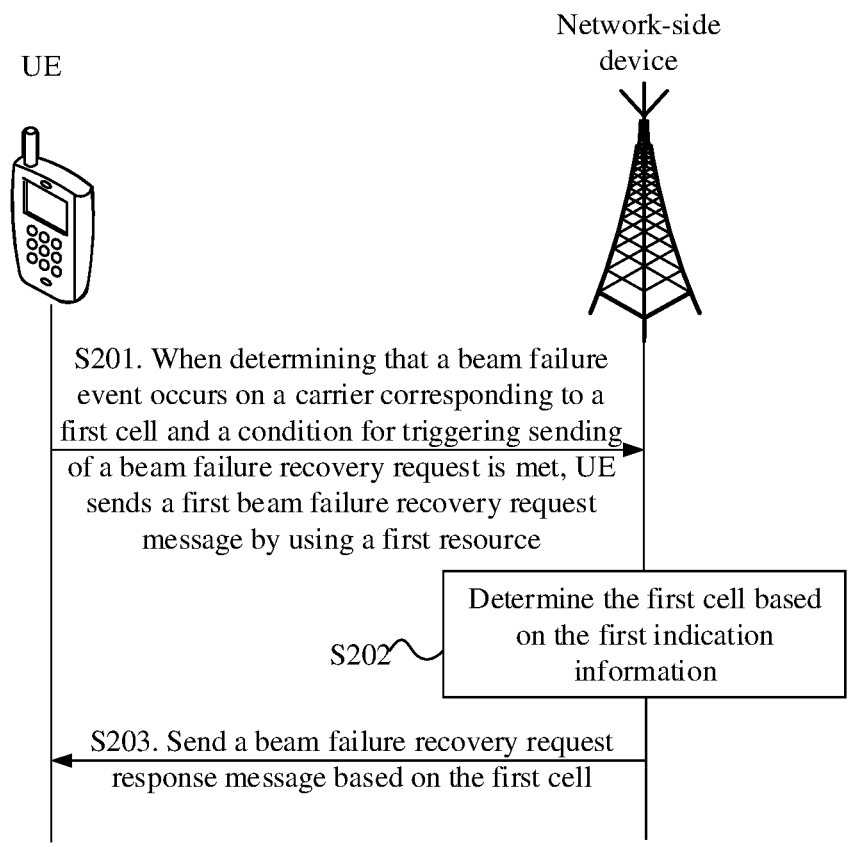
FIG. 2 is an interaction 1 of a beam failure recovery method in a multi-carrier system according to an embodiment of this disclosure.

The UE provided in this embodiment of this disclosure can implement each step performed by UE in FIG. 2 in the foregoing method embodiments. To avoid repetition, details are not described herein again.

The UE provided in this embodiment of this disclosure sends, when determining that a beam failure event occurs on a carrier corresponding to a first cell and a condition for triggering sending of a beam failure recovery request is met, a first beam failure recovery request message to a network-side device by using a first resource, where the first beam failure recovery request message includes first indication information, and the first indication information is used to indicate the first cell; and receives a beam failure recovery request response message from the network-side device. Because the beam failure recovery request sent by the UE to the network-side device includes the first indication information that can indicate a cell corresponding to a carrier on which a beam failure event occurs, the network-side device can determine, based on the first indication information included in the beam failure recovery request, a cell in which a beam failure event occurs, so as to send the beam failure recovery request response message to the UE based on the cell in which a beam failure event occurs. Therefore, the UE provided in this embodiment of this disclosure can resolve a problem that a beam failure recovery mechanism in the related art cannot perform beam failure recovery when a beam failure occurs on a carrier in a multi-carrier system.

An embodiment of this disclosure provides UE. Referring to FIG. 8, the UE includes a sending unit 82 and a receiving unit 81.

The sending unit 82 is configured to send, when it is determined that a beam failure event occurs on a carrier corresponding to a first cell and a condition for triggering sending of a beam failure recovery request is met, a first beam failure recovery request message to a network-side device by using a first resource, where the first resource is uniquely corresponding to the first cell.

The receiving unit 81 is configured to receive a beam failure recovery request response message from the network-side device.

Optionally, the UE further includes a detection unit.

The receiving unit is further configured to receive configuration information sent by the network-side device, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

The detection unit is configured to detect a BFD RS of each carrier in the multi-carrier system based on the cell information and/or the BWP information in which the second resource is located.

The UE provided in the foregoing embodiment sends, when determining that a beam failure event occurs on a carrier corresponding to a first cell and a condition for triggering sending of a beam failure recovery request is met, a first beam failure recovery request message to a network-side device by using a first resource, and receives a beam failure recovery request response message from the network-side device. Because the first resource is uniquely corresponding to the first cell, the network-side device can determine, based on the first resource used to send the beam failure recovery request message, a cell in which a beam failure event occurs, so as to send the beam failure recovery request response message to the UE based on the cell in which a beam failure event occurs. Therefore, the UE provided in this embodiment of this disclosure can resolve a problem that a beam failure recovery mechanism in the related art cannot perform beam failure recovery when a beam failure occurs on a carrier in a multi-carrier system.

An embodiment of this disclosure provides UE. Referring to FIG. 8, the UE includes a sending unit 82 and a receiving unit 81.

The sending unit 82 is configured to send, when it is determined that a beam failure event occurs on a carrier corresponding to a first BWP and a condition for triggering sending of a beam failure recovery request is met, a first beam failure recovery request message to a network-side device by using a first resource, where the first resource is uniquely corresponding to the first BWP.

The receiving unit 81 is configured to receive a beam failure recovery request response message from the network-side device.

Optionally, the UE further includes a detection unit.

The receiving unit is further configured to receive configuration information from the network-side device, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

The detection unit is further configured to detect a BFD RS of each carrier in the multi-carrier system based on the cell information and/or the BWP information in which the second resource is located.

The UE provided in the foregoing embodiment sends, when determining that a beam failure event occurs on a carrier corresponding to a first BWP and a condition for triggering sending of a beam failure recovery request is met, a first beam failure recovery request message to a network-side device by using a first resource, and receives a beam failure recovery request response message from the network-side device. Because the first resource is uniquely corresponding to the first BWP, the network-side device can determine, based on the first resource used to send the beam failure recovery request message, a BWP on which a beam failure event occurs, so as to send the beam failure recovery request response message to the UE based on the first BWP on which a beam failure event occurs. Therefore, the UE provided in this embodiment of this disclosure can resolve a problem that a beam failure recovery mechanism in the related art cannot perform beam failure recovery when a beam failure occurs on a carrier in a multi-carrier system.

Figure 9:
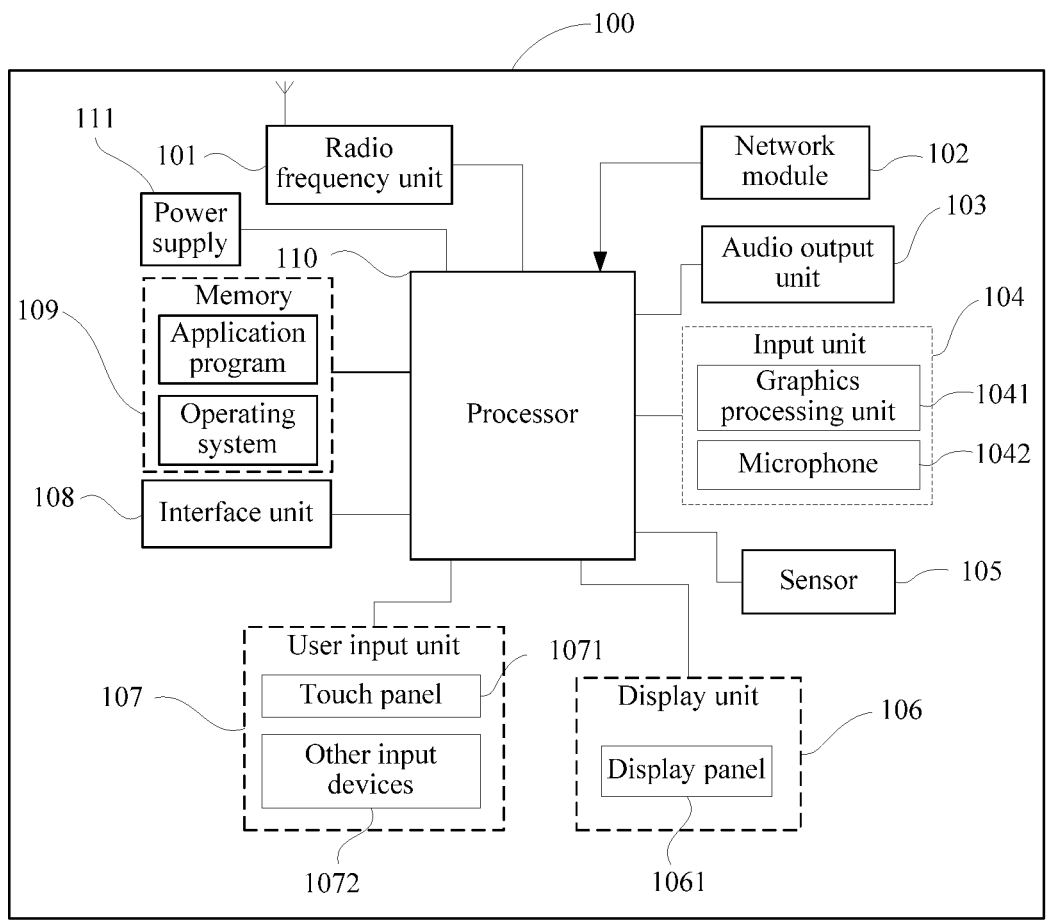
FIG. 9 is a schematic structural diagram of hardware of UE according to an embodiment of this disclosure.

FIG. 9 is a schematic structural diagram of hardware of UE implementing the embodiments of this disclosure. The UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that the structure of the UE shown in FIG. 9 does not constitute a limitation on the UE, and the UE may include more or fewer components than those shown in the diagram, or some components may be combined, or the components may be disposed in different manners. In this embodiment of this disclosure, the UE includes but is not limited to a mobile phone, a tablet computer, a laptop computer, a vehicle-mounted terminal, a wearable device, a pedometer, and the like.

The radio frequency unit 101 is configured to send, when it is determined that a beam failure event occurs on a carrier corresponding to a first cell and a condition for triggering sending of a beam failure recovery request is met, a first beam failure recovery request message to a network-side device by using a first resource, and receive a beam failure recovery request response message from the network-side device.

The first beam failure recovery request message includes first indication information, and the first indication information is used to indicate the first cell.

Alternatively, the radio frequency unit 101 is configured to send, when it is determined that a beam failure event occurs on a carrier corresponding to a first cell and a condition for triggering sending of a beam failure recovery request is met, a first beam failure recovery request message to a network-side device by using a first resource, and receive a beam failure recovery request response message from the network-side device.

The first resource is uniquely corresponding to the first cell.

Alternatively, the radio frequency unit 101 is configured to send, when it is determined that a beam failure event occurs on a carrier corresponding to a first BWP and a condition for triggering sending of a beam failure recovery request is met, a first beam failure recovery request message to a network-side device by using a first resource, and receive a beam failure recovery request response message from the network-side device.

The first resource is uniquely corresponding to the first BWP.

It should be understood that in this embodiment of this disclosure, the radio frequency unit 101 may be configured to receive and send information, or to receive and send a signal in a call process, and specifically, after receiving downlink data from a base station, send the downlink data to the processor 110 for processing; and also send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices through a wireless communications system.

The UE provides a user with wireless broadband Internet access by using the network module 102, for example, helping the user send or receive an e-mail, browse a web page, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, a call signal reception sound or a message reception sound) related to a specific function performed by the UE 100. The audio output unit 103 includes a speaker, a buzzer, a telephone receiver, and the like.

The input unit 104 is configured to receive an audio or video signal. The input unit 104 may include a graphics processing unit (Graphics Processing Unit, GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or other storage media) or sent by the radio frequency unit 101 or the network module 102. The microphone 1042 can receive a sound and can process the sound into audio data. The processed audio data can be converted into a format that can be sent to a mobile communication base station through the radio frequency unit 101 in a telephone call mode, for outputting.

The UE 100 further includes at least one sensor 105, for example, a light sensor, a motion sensor, and other sensors. Specifically, the light sensor includes an ambient light sensor and a proximity sensor. The ambient light sensor may adjust luminance of the display panel 1061 based on brightness of ambient light, and the proximity sensor may turn off the display panel 1061 and/or backlight when the UE 100 moves close to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the UE (such as switching between landscape and portrait, related games, and magnetometer posture calibration), vibration recognition related functions (such as a pedometer and stroke), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include a display panel 1061, and the display panel 1061 may be configured in the form of a liquid crystal display (Liquid Crystal Display, LCD), an organic light-emitting diode (Organic Light-Emitting Diode, OLED), or the like.

The user input unit 107 may be configured to receive entered digit or character information and generate a key signal input related to a user setting and function control of the UE. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 110, and receives and executes a command sent by the processor 110. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 9, the touch panel 1071 and the display panel 1061 serve as two independent components to implement input and output functions of the UE. In some embodiments, however, the touch panel 1071 may be integrated with the display panel 1061 to implement the input and output functions of the UE. Details are not limited herein.

The interface unit 108 is an interface between an external apparatus and the UE 100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 108 may be configured to receive an input (for example, data information or power) from the external apparatus and transmit the received input to one or more elements within the UE 100, or may be configured to transmit data between the UE 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a non-volatile memory, for example, at least one magnetic disk storage device, a flash storage device, or other volatile solid-state storage devices.

The processor 110 is a control center of the UE, uses various interfaces and lines to connect a plurality of parts of the entire UE, and executes various functions and processing data of the UE by running or executing software programs and/or modules stored in the memory 109 and invoking data stored in the memory 109, so as to perform overall monitoring on the UE. The processor 110 may include one or more processing units. Optionally, the processor 110 may integrate an application processor and a modem processor. The application processor mainly processes an operating system, a user interface, an application program, and the like. The modem processor mainly processes wireless communication. It may be understood that the modem processor may alternatively not be integrated into the processor 110.

The UE 100 may further include the power supply 111 (for example, a battery) that supplies power to a plurality of component. Optionally, the power supply 111 may be logically connected to the processor 110 by using a power management system, so as to implement functions such as charging management, discharging management and power consumption management by using the power management system.

In addition, the UE 100 includes some functional modules that are not shown. Details are not described herein.

Embodiment 6

Figure 10:
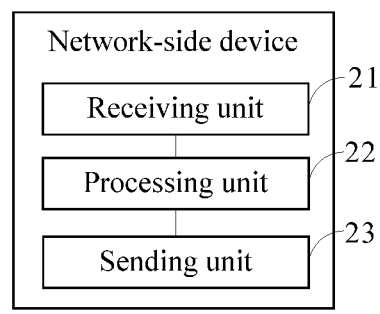
FIG. 10 is a schematic structural diagram of a network-side device according to an embodiment of this disclosure.

An embodiment of this disclosure provides a network-side device. Specifically, referring to FIG. 10, the network-side device includes a receiving unit 21, a processing unit 22, and a sending unit 23.

The receiving unit 21 is configured to receive a first beam failure recovery request message sent by UE by using a first resource, where the first beam failure recovery request message includes first indication information, the first indication information is used to indicate a first cell, and the first cell is a cell corresponding to a carrier on which a beam failure event occurs.

The processing unit 22 is configured to determine the first cell based on the first indication information.

The sending unit 23 is configured to send a beam failure recovery request response message to the UE based on the first cell.

Optionally, the first beam failure recovery request message further includes second indication information, where the second indication information is used to indicate a BWP on which a beam failure event occurs in the first cell.

The processing unit 22 is further configured to determine, based on the second indication information, a BWP on which a beam failure event occurs in the first cell.

The sending unit 23 is further configured to send a beam failure recovery request response message to the UE based on the BWP on which a beam failure event occurs in the first cell.

Optionally, the sending unit is further configured to send configuration information to the UE, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

Another embodiment of this disclosure provides a network-side device. Specifically, referring to FIG. 10, the network-side device includes a receiving unit 21, a processing unit 22, and a sending unit 23.

The receiving unit 21 is configured to receive a first beam failure recovery request message sent by user equipment UE by using a first resource, where the first resource is uniquely corresponding to the first cell, and the first cell is a cell corresponding to a carrier on which a beam failure event occurs.

The processing unit 22 is configured to determine the first cell based on the first resource.

The sending unit 23 is configured to send a beam failure recovery request response message to the UE based on the first cell.

Optionally, the sending unit 23 is further configured to send configuration information to the UE, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

Another embodiment of this disclosure provides a network-side device. Specifically, referring to FIG. 10, the network-side device includes a receiving unit 21, a processing unit 22, and a sending unit 23.

The receiving unit 21 is configured to receive a first beam failure recovery request message sent by user equipment UE by using a first resource, where the first resource is uniquely corresponding to a first BWP.

The processing unit 22 is configured to determine the first BWP based on the first resource.

The sending unit 23 is configured to send a beam failure recovery request response message to the UE based on the first BWP.

Optionally, the sending unit 23 is further configured to send configuration information to the UE, where the configuration information includes cell information and/or BWP information in which a second resource is located, and the second resource is a resource of a beam failure detection reference signal BFD RS that is sent by the network-side device and that is used to detect whether a beam failure occurs on each carrier in the multi-carrier system.

Figure 11:
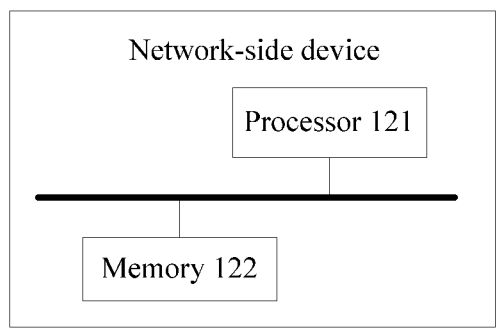
FIG. 11 is a schematic structural diagram of hardware of a network-side device according to an embodiment of this disclosure.

An embodiment of this disclosure further provides a network-side device. Referring to FIG. 11, the network-side device includes: a processor 121, a memory 122, and a computer program that is stored in the memory 122 and capable of running on the processor 121. When the computer program is executed by the processor 121, the steps performed by the network-side device in the beam failure recovery method in a multi-carrier system described in Embodiment 1, Embodiment 2 and Embodiment 3 are implemented, and a same technical effect can be achieved. To avoid repetition, details are not described herein again.

Embodiment 7

An embodiment of this disclosure further provides a computer-readable storage medium, where a computer program is stored in the computer-readable storage medium. When the computer program is executed by a processor, a plurality of procedures of the beam failure recovery method in a multi-carrier system described in Embodiment 1, Embodiment 2 and Embodiment 3 are implemented, and a same technical effect can be achieved. To avoid repetition, details are not described herein again. The computer-readable storage medium is, for example, a read-only memory (Read-Only Memory, ROM), a random access memory (Random Access Memory, RAM), a magnetic disk, or an optical disk.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network-side device, or the like) to perform the method described in the plurality of embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A beam failure recovery method in a multi-carrier system, applied to user equipment UE,
    wherein the method comprises:
    when determining that a beam failure event occurs on a carrier corresponding to a first cell and a condition for triggering sending of a beam failure recovery request is met, sending a first beam failure recovery request message to a network-side device by using a first resource,
    wherein the first beam failure recovery request message comprises first indication information, and the first indication information is used to indicate the first cell; and
    receiving a beam failure recovery request response message from the network-side device,
    wherein before sending the first beam failure recovery request message to the network-side device by using the first resource, the method further comprises:
    receiving configuration information from the network-side device,
    wherein the configuration information comprises at least one of cell information or BWP information in which a second resource is located, and the second resource is a resource of a beam failure detection reference signal (BFD RS) that is sent by the network-side device and that is used to detect whether a beam failure occurs on each carrier in the multi-carrier system; and
    detecting a BFD RS of each carrier in the multi-carrier system based on at least one of the cell information or the BWP information in which the second resource is located.

2. The method according to claim 1, wherein the first beam failure recovery request message further comprises second indication information, and
    the second indication information is used to indicate a bandwidth part (BWP) on which a beam failure event occurs in the first cell.

3. The method according to claim 2, wherein the second indication information is index information of the BWP on which a beam failure event occurs in the first cell.

4. The method according to claim 2, wherein
the first resource comprises a first signaling field and a third signaling field,
the first signaling field is used to carry the first indication information, and the third signaling field is used to carry the second indication information;
or
the first resource comprises a first signaling field, a second signaling field, and a third signaling field,
the first signaling field is used to carry the first indication information, the second signaling field is used to carry third indication information, the third signaling field is used to carry the second indication information, and the third indication information is used to indicate that a beam failure event occurs.

5. The method according to claim 1, wherein the first indication information is index information of the first cell.

6. The method according to claim 1, wherein
the first resource is an uplink resource in at least one cell in a first cell group, and the first cell group is a cell group formed by a plurality of cells corresponding to a plurality of carriers of the multi-carrier system.

7. The method according to claim 1, wherein
the first resource is an uplink resource in at least one of bandwidth parts BWPs in a configured cell, the configured cell is a cell, in a first cell group, configured with at least one of a physical uplink control channel (PUCCH) resource or a physical random access channel PRACH resource, and the first cell group is a cell group formed by a plurality of cells corresponding to a plurality of carriers of the multi-carrier system.

8. The method according to claim 1, wherein
the first resource comprises a first signaling field, and
the first signaling field is used to carry the first indication information; or
the first resource comprises a first signaling field and a second signaling field,
the first signaling field is used to carry the first indication information, the second signaling field is used to carry third indication information, and the third indication information is used to indicate that a beam failure event occurs.

9. The method according to claim 8, wherein at least one of the first signaling field, the second signaling field and the third signaling field is further configured to carry a scheduling request SR.

10. User equipment (UE), comprising a processor, a memory, and a computer program that is stored in the memory and capable of running on the processor, wherein when the computer program is executed by the processor, following steps are implemented:
when determining that a beam failure event occurs on a carrier corresponding to a first cell and a condition for triggering sending of a beam failure recovery request is met, sending a first beam failure recovery request message to a network-side device by using a first resource, wherein the first beam failure recovery request message comprises first indication information, and the first indication information is used to indicate the first cell; and
receiving a beam failure recovery request response message from the network-side device,
wherein before sending the first beam failure recovery request message to the network-side device by using the first resource, following steps are further implemented when the computer program is executed by the processor:
receiving configuration information from the network-side device, wherein the configuration information comprises at least one of cell information or BWP information in which a second resource is located, and the second resource is a resource of a beam failure detection reference signal BFD RS that is sent by the network-side device and that is used to detect whether a beam failure occurs on each carrier in the multi-carrier system; and
detecting a BFD RS of each carrier in the multi-carrier system based on at least one of the cell information or the BWP information in which the second resource is located.

11. The UE according to claim 10, wherein the first beam failure recovery request message further comprises second indication information, and
the second indication information is used to indicate a bandwidth part (BWP) on which a beam failure event occurs in the first cell.

12. The UE according to claim 11, wherein the second indication information is index information of the BWP on which a beam failure event occurs in the first cell.

13. The UE according to claim 11, wherein the first resource comprises a first signaling field and a third signaling field, the first signaling field is used to carry the first indication information, and the third signaling field is used to carry the second indication information; or the first resource comprises a first signaling field, a second signaling field, and a third signaling field, the first signaling field is used to carry the first indication information, the second signaling field is used to carry third indication information, the third signaling field is used to carry the second indication information, and the third indication information is used to indicate that a beam failure event occurs.

14. The UE according to claim 10, wherein the first indication information is index information of the first cell.

15. The UE according to claim 10, wherein the first resource is an uplink resource in at least one cell in a first cell group, and the first cell group is a cell group formed by a plurality of cells corresponding to a plurality of carriers of the multi-carrier system.

16. The UE according to claim 10, wherein the first resource is an uplink resource in at least one of bandwidth parts BWPs in a configured cell, the configured cell is a cell, in a first cell group, configured with at least one of a physical uplink control channel (PUCCH) resource or a physical random access channel PRACH resource, and the first cell group is a cell group formed by a plurality of cells corresponding to a plurality of carriers of the multi-carrier system.

17. The UE according to claim 10, wherein the first resource comprises a first signaling field, and the first signaling field is used to carry the first indication information; or the first resource comprises a first signaling field and a second signaling field, the first signaling field is used to carry the first indication information, the second signaling field is used to carry third indication information, and the third indication information is used to indicate that a beam failure event occurs.

18. A non-transitory computer-readable storage medium, wherein the computer-readable storage medium stores a computer program, and when the computer program is executed by a processor, following steps are implemented:
when determining that a beam failure event occurs on a carrier corresponding to a first cell and a condition for triggering sending of a beam failure recovery request is met, sending a first beam failure recovery request message to a network-side device by using a first resource, wherein the first beam failure recovery request message comprises first indication information, and the first indication information is used to indicate the first cell; and receiving a beam failure recovery request response message from the network-side device, wherein before sending the first beam failure recovery request message to the network-side device by using the first resource, following steps are further implemented when the computer program is executed by the processor:

receiving configuration information from the network-side device, wherein the configuration information comprises at least one of cell information or BWP information in which a second resource is located, and the second resource is a resource of a beam failure detection reference signal BFD RS that is sent by the network-side device and that is used to detect whether a beam failure occurs on each carrier in the multi-carrier system; and detecting a BFD RS of each carrier in the multi-carrier system based on at least one of the cell information or the BWP information in which the second resource is located.

* * * * *